UNITED STATES PATENT OFFICE.

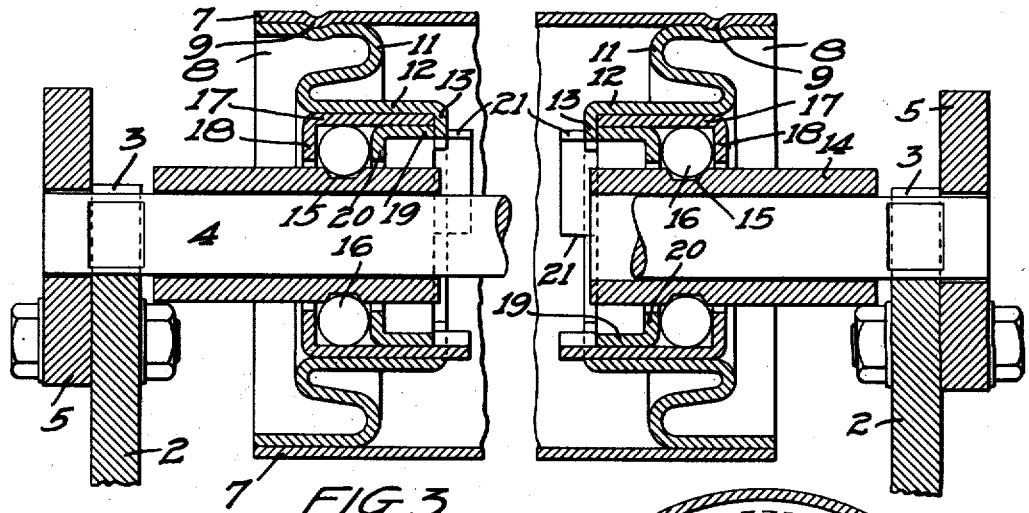

HERMAN J. BUCK, OF ELLWOOD CITY, PENNSYLVANIA, ASSIGNOR TO MATHEWS GRAVITY CARRIER COMPANY, OF ELLWOOD CITY, PENNSYLVANIA, A CORPORATION.

BALL-BEARING FOR GRAVITY-CARRIERS.

1,238,880.  Specification of Letters Patent.  Patented Sept. 4, 1917.

Application filed February 8, 1914. Serial No. 816,142.

*To all whom it may concern:*

Be it known that I, HERMAN J. BUCK, a citizen of the United States, resident of Ellwood City, county of Lawrence, and State of Pennsylvania, have invented certain new and useful Improvements in Ball-Bearings for Gravity-Carriers, of which the following is a specification.

The object of my invention is to provide a gravity carrier having anti-friction bearings for the rolls or conveyer members which will allow the convenient removal of the rolls from their supports in case of wear or breakage of any portion of a bearing, or a roll.

A further object is to provide a conveyer having bearings for its rolls that are of simple, inexpensive construction but strong and durable.

A further object is to provide a ball bearing which can be easily and quickly removed from the conveyer without removing the balls from the cage or ball race.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a gravity carrier embodying my invention,

Fig. 2 is a side elevation of the same,

Fig. 3 is a transverse sectional view of the carrier, showing one of the carrier rolls in longitudinal section, the middle portion thereof being broken away.

Fig. 4 is a transverse sectional view of one of the carrier rolls.

Fig. 5 is a detail view of the ball bearing cage or ball race.

In the drawing, 2 represents the side rails of the carrier having slots 3 to receive rods or axes 4 of the anti-friction wheels or rolls. These rods are preferably secured in the rails by the locking bars 5, through which bolts pass to secure them to the rails 2. 7 represents a conveyer or carrier roll, preferably made of steel tubing, open at each end and provided with a head 8 that fits snugly into the end of the roll and locked therein by a boss 9 pressed or punched out of the roll into the surface of the head. Any other suitable means may be employed for securing the head and the conveyer roll together. The head 8 is provided with an inwardly projecting web 11 terminating in a flange 12 that is parallel substantially with the axis of the roll 8 and is provided at suitable intervals with inwardly projecting lugs 13. A sleeve 14 is loosely mounted on each end of the rod 4 and provided with an annular groove 15 forming a race for the bearing balls 16. A ring 17 is fitted to slide within the flange 12 and its outer end is inwardly turned to form the outer wall 18 of the bearing ball cage. A similar ring 19 fits within the ring 17 and has an inwardly turned wall 20 forming the inner wall of the bearing ball cage. The ring 17 has slots 21 therein which receive the lugs 13 on the flange 12. Thereby the conveyer roll, the cage formed of the rings 17 and 19 and the sleeve 14 are locked together.

The sleeves 14 have long bearing surfaces on the rod 4, and when the carrier or conveyer is set up, the longitudinal movement of the sleeves will be limited by the rails 2. Whenever desired the ends of the rods may be released and raised until the sleeve at either end or the sleeves at both ends can be removed therefrom, the rings 17 and 19 sliding out of engagement with the flange 12 and the lugs 13, and allowing the complete separation of the ball bearings from the rod and roll. The rings 17 and 19 are locked together by any suitable means, preferably by frictional engagement with each other, the ring 19 being pressed closely within the ring 17.

The sleeve 14 fits snugly upon the rod 4, but is capable of turning thereon. When the device is in operation, said sleeve 14 will rotate slowly upon said rod, thereby constantly changing its position upon the rod, while the roll will rotate freely and at a greater speed upon the sleeve owing to the ball bearing between said sleeve and said roll.

This arrangement constantly changes the part of the sleeve that is uppermost and which receives the pressure of the load from the balls. The bearing surface of the sleeve is therefore constantly changed, thus insuring long life for said sleeve. If preferred, however, means may be provided for locking the sleeve against rotary movement.

While I have shown balls as the anti-friction member of the bearing and generally prefer to use them, it is obvious that suitable rolls may be substituted for the balls, particularly for heavy work, without departing from my invention.

The details of the construction may be modified in many particulars without departing from my invention.

I claim as my invention:

1. In a gravity carrier, the combination, with a rod, of a roll having an anti-friction bearing on said rod, said bearing comprising a sleeve loosely mounted on said rod, a cage carried by said sleeve and having slots to receive lugs provided on said roll for simultaneous rotary movement with said roll, said cage being capable of movement lengthwise of said roll to engage it with said lugs or disengage it therefrom, and bearing balls interposed between said cage and said sleeve.

2. In a gravity carrier, the combination with a rod, of a roll having an anti-friction bearing on said rod, said bearing comprising a sleeve loosely mounted on said rod and capable of rotary and longitudinal movement thereon, a cage carried by said sleeve, means connecting said cage and said roll for simultaneous rotation, said cage being capable of movement longitudinally of said roll to engage it therewith or disengage it therefrom, and bearing-balls interposed between said cage and said sleeve.

3. In a gravity carrier, the combination, with a rod, of a tubular roll provided with open ends and having an anti-friction bearing on said rod, said bearing comprising a sleeve loosely mounted on said rod and capable of rotary and longitudinal movement thereon, a cage carried by said sleeve, means connecting said cage and said roll for simultaneous rotation, said cage being capable of movement longitudinally of said roll to engage it therewith or disengage it therefrom, and bearing-balls interposed between said cage and said sleeve.

4. In a gravity carrier, the combination, with a rod, of a roll having an anti-friction bearing on said rod, said bearing comprising a sleeve loosely mounted on said rod and capable of rotary and longitudinal movement thereon and provided upon its outer periphery with an annular groove, a cage carried by said sleeve, means connecting said cage and said roll for simultaneous rotation, said cage being capable of movement longitudinally of said roll to engage it therewith or disengage it therefrom, and bearing-balls interposed between said cage and said sleeve and extending into said groove and preventing longitudinal movement of said cage upon said sleeve.

5. In a gravity carrier, the combination with a rod, of a roll having at each end an anti-friction bearing on said rod, each bearing comprising a sleeve loosely mounted on said rod, and capable of rotary and longitudinal movement thereon, a cage carried by each sleeve, means connecting each cage with said roll for simultaneous rotation, each cage being capable of movement longitudinally of said roll to engage it therewith or disengage it therefrom, and bearing-balls interposed between each cage and the sleeve by which it is carried.

In witness whereof, I have hereunto set my hand this 20th day of January, 1914.

HERMAN J. BUCK.

Witnesses:
 FRANK E. MOORE,
 JOS. W. HUMPHREY.